R. MACK.
ELECTRIC SEAM WELDING APPARATUS.
APPLICATION FILED SEPT. 17, 1912.
1,135,539.
Patented Apr. 13, 1915.
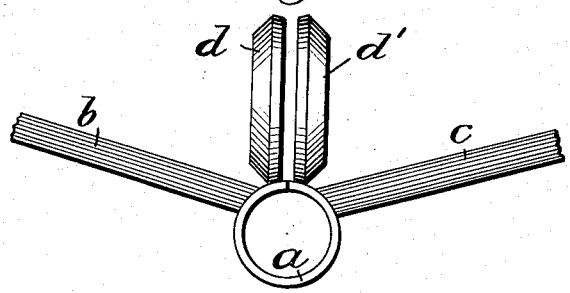
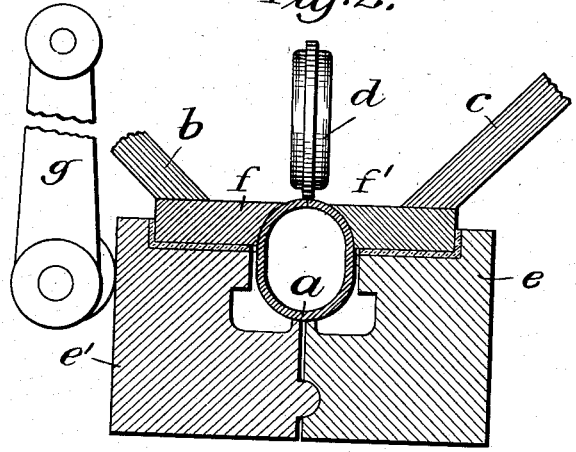
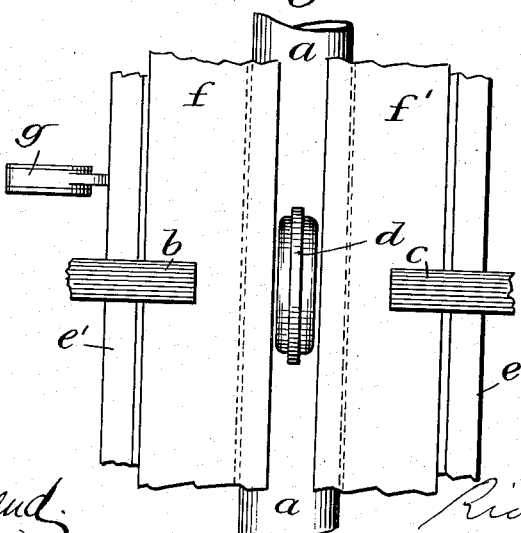

UNITED STATES PATENT OFFICE.

RICHARD MACK, OF BERLIN, GERMANY, ASSIGNOR TO THOMSON ELECTRIC WELDING COMPANY, OF LYNN, MASSACHUSETTS, A CORPORATION OF MASSACHUSETTS.

ELECTRIC SEAM-WELDING APPARATUS.

1,135,539.  Specification of Letters Patent.  Patented Apr. 13, 1915.

Application filed September 17, 1912. Serial No. 720,714.

*To all whom it may concern:*

Be it known that I, RICHARD MACK, a subject of the Emperor of Germany, and a resident of Berlin, Germany, have invented certain new and useful Improvements in Electric Seam-Welding Apparatus, of which the following is a specification.

This invention relates to apparatus for electrically welding the seams of pipes, cylinders or other metal work.

The object of the invention is to provide a simple, efficient apparatus for welding the longitudinal seams in metal work of various kinds and to this end consists in supplying the heating electric current to the work and applying the welding pressure thereto in a new and improved manner.

According to this invention the heating current is supplied by means of brushes, preferably stationary, which feed the current to the work from both sides of the seam to be welded. A separate pressure device is employed, preferably in the form of a roller, which, since it does not conduct any current can be made of hard material such as steel, thus avoiding continual trimming of the roller and allowing a great pressure to be exerted directly on or in close proximity to the seam.

The invention consists in the improved electric welding apparatus hereinafter more particularly described and then specified in the claims.

In the accompanying drawings, Figure 1 is a diagrammatic view of portions of an apparatus arranged in accordance with this invention. Fig. 2 is a diagrammatic section through a modified form of apparatus in accordance with this invention. Fig. 3 is a plan view of the form shown in Fig. 2.

In the drawings $a$ indicates the pipe the edges of which are to be preferably butt welded. This pipe or cylinder is held in any suitable form of clamps or support and the heating electric current is introduced thereto through brushes $b$ and $c$ isolated from each other and each connected to one terminal of the source of current supply as for instance a transformer as is usual in the art. The necessary welding pressure is applied by two rollers or cylinders $d$, $d'$ placed one on each side of the seam to be welded. The brushes in this instance make direct contact with the walls of the pipe $a$ and move along such surface.

To get the best effect, the pressure rollers $d$ and $d'$ are placed in line with the brushes $b$ and $c$ and the pipe is fed along, the rollers and brushes remaining stationary. It will be understood that the pipe may remain stationary, if desired, and the brushes and rollers fed along.

In the embodiment of the invention shown in Figs. 2 and 3, the pipe or cylinder $a$ is held between clamps or platens $e$ and $e'$ movable toward each other by an eccentric lever $g$, the pipe being gripped by jaws $f$ $f'$ on either side of the seam to be welded. In this case the brushes $b$, $c$ rub on the surface of the jaws $f$, $f'$ and supply current to the work. $d$ indicates the pressure roller which runs along the abutted edges and serves to also flatten down the burr as well as apply the welding pressure. As this roller should not conduct current from one edge of the pipe to the other, it is provided with an insulated surface where the roller contacts with the work. In practice the layer of oxide or dirt which forms on the surface of the pipe is sufficient, but if desirable, a layer of insulation such as mica or other suitable material may be provided on the periphery of the roller.

It will be understood that the drawings herein shown are diagrammatic and for the purpose of illustration only, electric welding machines and their operation in general being now so well known that detailed description is herein deemed unnecessary.

What I claim as my invention is:—

1. In an electric seam welding apparatus, the combination of current supplying electrodes making a wiping contact with the work and non-conducting pressure rollers located between said electrodes.

2. In an electric seam welding apparatus the combination of brushes adapted to supply current to the work by direct wiping contact with the surface at opposite sides of the seam and a pair of non-conducting pressure rollers adapted to apply pressure to the work at each side of the seam.

Signed at Berlin, Germany, this third day of September, A. D. 1912.

RICHARD MACK.

Witnesses:
 JULIUS RUMBACH,
 ALFRED WOLF.